United States Patent [19]

Carrigan

[11] 4,337,860
[45] Jul. 6, 1982

[54] DETACHABLE WRENCH SET ORGANIZER AND STORAGE UNIT

[76] Inventor: Alfred C. Carrigan, 22324 NE. Finn Hill Rd., Brush Prairie, Wash. 98606

[21] Appl. No.: 304,315

[22] Filed: Sep. 21, 1981

[51] Int. Cl.$^3$ .............................................. B65D 85/20
[52] U.S. Cl. ..................... 206/376; 206/378; 206/493; 206/813; 206/818; 206/821; 403/361; 312/DIG. 33; 211/49 R; 211/60 T
[58] Field of Search ............... 206/349, 378, 375, 372, 206/376, 374, 806, 480, 493; 211/60 T, 49 R, 59.1; 312/DIG. 33; 403/361, 292, 165

[56] References Cited

U.S. PATENT DOCUMENTS

| | | | |
|---|---|---|---|
| 1,712,473 | 5/1929 | McWethy | 206/378 |
| 2,065,341 | 12/1936 | McNaught et al. | 206/378 |
| 2,111,642 | 3/1938 | Saier | 403/361 |
| 3,405,377 | 10/1968 | Pierce | 206/378 |
| 3,726,393 | 4/1973 | Thompson | 206/378 |
| 3,830,008 | 8/1974 | Johnson | 403/361 |
| 4,043,453 | 8/1977 | Greenlee | 206/493 |
| 4,150,746 | 4/1979 | Buglione | 206/372 |

FOREIGN PATENT DOCUMENTS 949040 9/1956 Fed. Rep. of Germany ...... 206/378

Primary Examiner—William Price
Assistant Examiner—B. J. Ehrhardt
Attorney, Agent, or Firm—Chernoff & Vilhauer

[57] ABSTRACT

A storage/organizer unit for the fittings of detachable wrench sets of the polygonal socket and crowfoot design types. The units comprise a base member with one or more rows of spaced holes adapted to removably receive a multiplicity of circularly cylindrical posts of various diameters corresponding to the standard drive dimensions of the detachable wrench sets. The posts have tapered bosses on the bottom to be removably inserted into the spaced holes and the upper cylindrical post is of two styles: Tapered, or stackable, and straight sided, which latter can be used to hold, for example, several of the crowfoot design. The tapered design permits easy removal and replacement of the several kinds of individual fittings. The base member can have a magnetic material impregnated therein for mounting on iron or steel surfaces, or can incorporate on the bottom surface, a "non-sticky" adhesive for affixing to non-magnetic surfaces.

4 Claims, 6 Drawing Figures

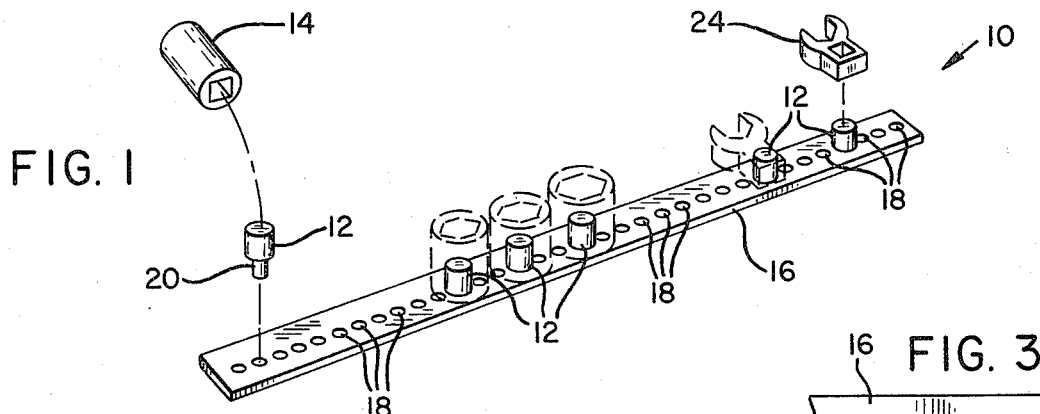
FIG. 1
FIG. 3
FIG. 2
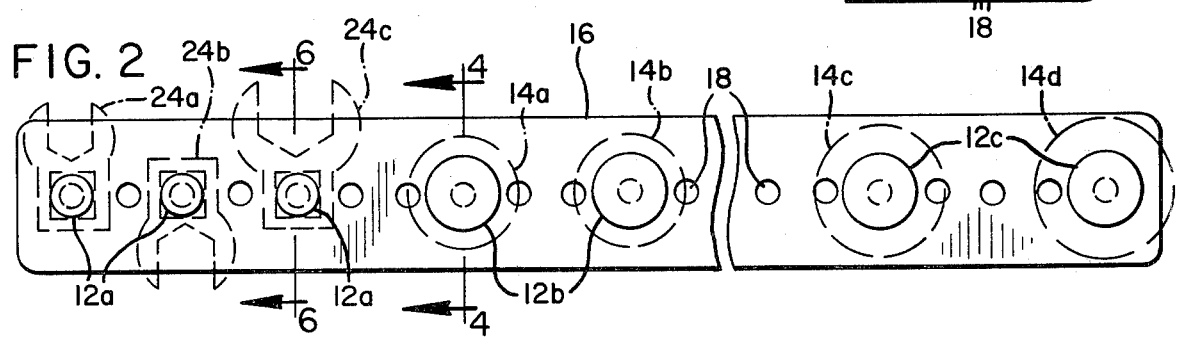
FIG. 4
FIG. 6
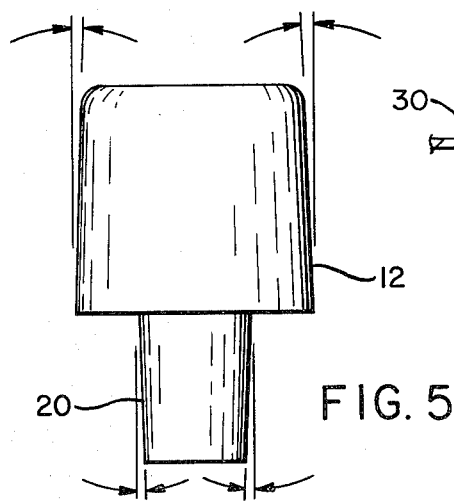
FIG. 5

DETACHABLE WRENCH SET ORGANIZER AND STORAGE UNIT

BACKGROUND OF THE INVENTION

This invention relates to improvements in storage/organizer systems for tools, and particularly such systems for storing and organizing the fittings of detachable wrench sets of the socket and "crowfoot" types typically used by mechanics and others.

A problem encountered when using such detachable wrench sets is the difficulty of identifying, selecting, removing and replacing the fittings under actual working conditions where there is, typically, poor lighting, cramped space, greasy tools and otherwise dirty environment. In such conditions the user often must select and replace the fittings "blind", that is, without looking at them. Oftentimes one hand will be engaged, so that the replacement of one fitting and the selection and removal of another, will have to be done blind and with one hand. Under such conditions it is not unusual for tools to become scattered, mislaid or lost, and any improvement that enhances manipulation of the fittings in such circumstances promotes efficiency of performance and reduction in labor costs.

More particularly, a difficulty encountered with several previous storage systems, such as those disclosed in U.S. Pat. Nos. to McWethy 1,712,473; Thompson 3,726,393; or Greenlee 4,043,453, is that the storage posts are of the same configuration as the drive hole in the fitting. Although this design is natural, it requires that the user rotate the fitting until it matches the orientation of the posts, which may be difficult under many circumstances of use, such as those described above. This requirement is present whether the drive post configuration be square, hexagonal, star-shaped or any other shape except circularly cylindrical. Thompson's system does, however, permit the arrangement and intermixing of fitting sizes and drive hole dimensions.

Another difficulty is encountered when the storage system is of the type disclosed in U.S. Pat. Nos. to McNaught et al 2,065,341; Pierce 3,405,377; or Bulglione 4,150,746. These all require that the fitting be replaced in exactly the same position from which it was removed. These systems also will not accept the so-called "crowfoot" fittings, which are becoming more widely used.

A third type of storage/organizer unit is exemplified by those manufactured by Durston Manufacturing, of LaVerne, California and others. It uses wedge-shaped spring clips which fit into the square drive holes of the respective tool fittings. Although this system has the advantage, with Thompson, that different drive sizes and fitting dimensions can be intermixed, the fittings are difficult to remove, with the distinct possibility of injury to the user from the edges of the spring clips while trying to do so.

Another type of storage system, as exemplified by Chatay Products, of Indio, California, uses round posts for storage of fittings, which are cast into a base member. Consequently, they neither allow efficient use of space for different sized sockets, the mixing together of different drive dimension sockets nor the stacking of crowfeet fittings.

SUMMARY OF THE PRESENT INVENTION

The present invention overcomes the aforementioned difficulties and drawbacks of prior storage/organizer systems for detachable wrench set fittings by providing a system which permits the user to mix the familiar polygonal socket type fittings with other styles of replaceable fittings, such as the crowfoot and to replace such fittings without fumbling, under actual conditions of the workplace.

The versatility of the present invention is made possible by the use of removable storage posts with a circularly cylindrical configuration. This combination of features achieves what other systems had sought to achieve and failed. The circular cross-section of the storage posts permits a universal orientation of the wrench fitting during replacement and storage, rather than the few positions allowed by past designs. The removability feature permits the user to arrange such tool fittings in any desired arrangement, mixing drive dimensions and tool sizes as required by a particular task, while permitting the tools to be stored in any arrangement which is convenient to the user, so that maximum efficiency of use is promoted.

In an illustrative embodiment, the tool-fitting storage/organizer system of the present invention is a detachable wrench head storage/organizer comprised of a flat planar base member, with a plurality of holes therein arranged in one or more rows, and a plurality of upright cylindrical posts fitted thereon, corresponding respectively in diameter to the drive dimension sizes of the various members of a socket or crowfoot set.

These posts, on which the individual socket or crowfoot members are removably placed for storage, each have projecting coaxially from their lower ends a boss which fits into a mating hole in the base member. On the top of each post a similar sized mating hole is provided to enable the post to be stacked with several others of similar diameter, if desired to accommodate two or more crowfoot wrench heads at a single post location.

The foregoing objectives, and other objectives, features and advantages of the present invention will be more readily perceived and understood upon consideration of the following detailed description of the invention, taken in conjunction with the accompanying drawings.

BRIEF DESCRIPTION OF THE DRAWINGS

FIG. 1 is a partially exploded perspective view of an illustrative embodiment of the tool fitting storage and organizer system of the present invention.

FIG. 2 is a top view of the base member of the present invention with the storage posts in place and the tool fittings to be mounted thereon indicated by dotted lines.

FIG. 3 is a bottom view of one end of the base member of FIG. 2.

FIG. 4 is a cross-sectional view of the base member through a hole, taken on the plane 4—4, as indicated in FIG. 2. A socket mounted on the post is indicated by the dotted lines.

FIG. 5 is a drawing of one embodiment of a post and boss.

FIG. 6 is a cross-sectional view of the base member through a hole, taken on the plane 6—6 in FIG. 2. It illustrates the stacking type of post inserted therein, with four of them stacked on one another, showing five of the crowfoot wrenches stored thereon.

DESCRIPTION OF THE PREFERRED EMBODIMENT OF THE INVENTION

Turning now to FIG. 1, the detachable wrench organizer/storage unit of the present invention indicated generally as 10, comprises a plurality of cylindrical posts 12 inserted in a plurality of spaced holes 18 in the top face of a flat planar base member 16. Each of said posts 12 has a boss 20 fabricated on the base thereof, said boss of a size and shape to be removably inserted in the aforesaid holes in the base member. The base member 16 is of a size and shape to contain one or more rows of said holes 18 fabricated therein and can have a means for affixing to a convenient surface also fabricated therein. This can be adhesive tape 30, affixed to the bottom of the base member as shown in FIG. 4, of the type that has a "non-sticky" adhesive on both sides thereof, or it can have magnetic particles distributed throughout the base member during fabrication, for sticking to an iron, steel or other magnetically responsive surface.

The posts in the invention must have circular cross section, as shown in FIGS. 1, 2, in order to gain the advantages of the invention. They can be in diameter any of the standard drive dimensions used in the trade. Drive dimensions of $\frac{1}{4}''$, $\frac{3}{8}''$ and $\frac{1}{2}''$ are most readily available, although dimensions of $\frac{3}{4}''$, $1''$ and even larger are useful for working on large machines. Even though the major use of this invention is contemplated to be with tools of smaller drive dimensions, it will be useful for detachable wrench fittings of any drive dimension.

As is evident from FIG. 2, the posts of a given size can be placed in whatever spacing is convenient for the user; the first three posts 12a are mounted in every other hole to accommodate the small drive dimension fittings 24a, 24b and 24c; the next two posts 12b are mounted in every third hole to accommodate larger fittings 14a and 14b; the last posts 12c are mounted in every fourth hole to permit the storage of large fittings 14c and 14d. The advantage of the invention for storing fittings of different size and drive dimensions is clearly apparent.

The posts 12 are preferably fabricated of an elastomeric material such as plastic or rubber to enable the fittings to be firmly grasped yet easily removed when desired.

The posts 12 can be of two forms for providing a functional engagement for removably holding the fittings on the posts: the first is tapered, as shown in FIG. 5. This makes it possible to place the fittings on the posts snugly and remove them easily, and to accommodate for minute differences in fittings due to wear or manufacturing variations.

The second form of post 12 is shown in FIG. 6, where several posts are shown stacked to permit storage of several of the crowfoot-type fittings 24a–e. These posts are not tapered, as it is desired that the fittings slide over them with a close fit. At the option of the user, a tapered post could be placed on the top to firmly hold the topmost fitting, and the lower fittings, in place The bosses may have a tapered shape, also. This permits the post to be pressed securely into the base member, yet permits them to be easily withdrawn whenever the arrangement and mix of posts and drive sizes is to be changed.

A taper on the posts, bosses and matching holes in the base member of 1°–2° is sufficient to obtain the advantages and features of the invention described above, even if the posts and base members were not fabricated of elastomeric materials, as is otherwise desirable as earlier described.

The bosses 20 preferably have circular cross-section, as indicated in FIGS. 1 and 2, as do the holes 28 in the top face of the posts 12 and the holes 18 in the base member. Of course, the bosses can be of any size and shape having sufficient strength to withstand normal handling and tool sizes. Obviously, posts for storing $\frac{3}{4}''$ and larger $1''$ drive dimension fittings will have to have, in normal use, posts of more rugged construction than posts for $\frac{1}{4}''$ to $\frac{1}{2}''$ fittings. However, the principles are the same.

However, the posts 12 necessarily have a circular cross section in order that the purposes of the invention be realized.

In practice, the user selects those fittings of the specific sizes in each drive dimension necessary to perform a particular task; selects sufficient mounting posts of each size to accommodate the fittings previously selected; inserts the posts in the spaced holes in the base to give the most convenient arrangement of fittings for the task at hand, and places the fittings thereon in the desired arrangement. The organizer then can be mounted on any convenient surface handy to the work location. If it is desired that the organizer be fixed in position, magnetic materials, which may be distributed throughout the material of the base member, will fix the organizer securely on an iron or steel surface. Likewise, double-sided sticky tape mounted on the bottom of the base member, as illustrated in FIG. 4, will fasten the storage unit of the present invention on most other types of surfaces.

The present invention thus provides a simple and adaptable means for storing and using detachable wrench fittings of the socket, crowfoot and similar styles, that are used with standard drive dimension tools. Various modes of realizing the advantages of the invention are possible, without departing from the spirit or intent of the invention. For example, the planar base member could have rows of small bosses protruding from its upper surface which engage mating holes in the bottom of the cylindrical storage posts, and the benefits of the invention could still be realized.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. Apparatus for organizing and storing individual ones of detachable members of tools having sets of said detachable members, said members having a drive hole in one end adapted to engage a drive member, and having the other end shaped to matingly engage nuts, bolt heads and the like, comprising:
   (a) a base member in the form of a planar strip having a plurality of spaced holes in its upper surface with means for affixing said base member to a support surface; and
   (b) a plurality of cylindrical posts, each having an upper cylindrical portion with a top face and a lower base portion with a boss attached thereto adapted to fit removably into said spaced holes in said base member, and said upper portion of said posts fitting with frictional engagement into said drive holes of said tool detachable members, whereby said detachable members may be pressed onto said posts for storage without regard to their radial orientation thereto.

2. The apparatus recited in claim 1 wherein said upper portion of each of said posts is of uniform diameter and has a hole in said top face thereof substantially the same size and shape as said bosses, whereby said posts may be stacked one on another.

3. The apparatus recited in claim 2 wherein said bosses and said holes in said base member are matingly shaped so as to provide a removable friction fit of said posts both when fit onto said base member and when stacked together.

4. The apparatus of any of claims 1, 2 or 3 wherein said posts are tapered along said upper cylindrical portions thereof so as to provide a removable friction fit when one of said tool detachable members is placed thereon.

* * * * *